UNITED STATES PATENT OFFICE.

CHARLES H. WILDER, OF NATICK, MASSACHUSETTS.

COMPOSITION FOR LINING VESSELS.

SPECIFICATION forming part of Letters Patent No. 372,733, dated November 8, 1887.

Application filed February 17, 1887. Serial No. 227,012. (No specimens.)

*To all whom it may concern:*

Be it known that I, CHARLES HENRY WILDER, of Natick, in the county of Middlesex and Commonwealth of Massachusetts, have invented a new and useful Compound Substance for Lining Vessels, of which the following is a specification.

My invention relates to the combination of materials used to form the compound substance and the application of the compound to the vessels to be lined, the object of it being to provide a lining for vessels used to hold caustic acids, which will prevent the corrosive action of the acid upon the substance of the vessel; and it consists in the compound substance below set forth and described, and application of such uniformly over the entire inside surface of the vessel to be protected by it. This is most easily done, when the compound is reduced to a fluid by heat, by pouring into the vessel to be lined, which should be warm, a considerable quantity of the melted compound, and then turning the vessel from side to side until the whole inner surface is covered with it and then inverting the vessel and letting all flow out that will. It is obvious that the compound may be applied in any other suitable manner by which it can be distributed uniformly over the surface.

The compound which adheres to the inner side of the vessel is left to dry, and when dry is fit for use, and will permanently protect the walls of the lined vessel from the action of the caustic acids which may be put into it, such as sulphuric, nitric, and other similar caustic acids.

To make the compound for the lining, I melt and intimately mingle together about equal parts, by weight, of paraffine and beeswax. To this I add a small quantity of dissolved rubber about in the proportion of one of rubber to forty-eight of the wax and paraffine. While this mixture is in a heated state I stir into and thoroughly mix with it finely-powdered red lead and litharge mixed in proportions of about three of red lead to one of litharge, the proportions of the powdered oxide to melted wax being about equal by weight. The lead and litharge act as a drier by absorbing the moisture in the wax and may be used in varying proportions; but I have found the proportions mentioned above the best in practice.

This lining may be applied to vessels of iron or other metals, and to vessels made of wood, wood-pulp, paper, or any other material of suitable strength.

I claim as new and my invention—

The composition herein described for lining vessels, composed of beeswax, paraffine, rubber, red lead, and litharge, in the proportions substantially as set forth.

CHARLES H. WILDER.

Witnesses:
 CHS. HOUGHTON,
 F. L. HOUGHTON.